May 9, 1967
H. L. HARTMAN
3,319,098
BEARING AND ROTOR ASSEMBLY
Filed Aug. 22, 1963
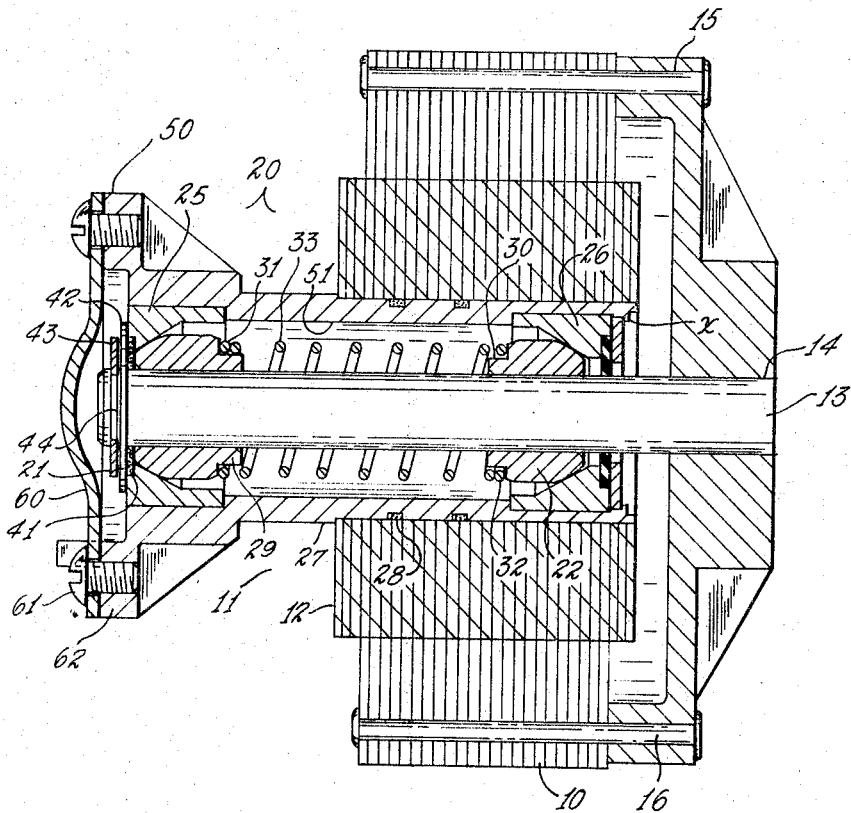
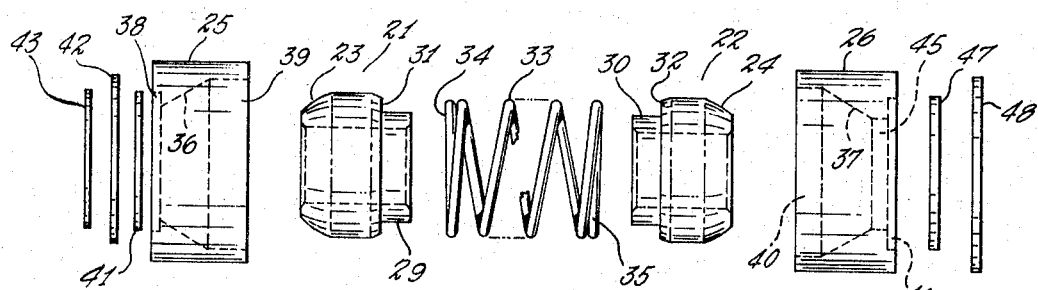
INVENTOR.
Herbert L. Hartman
BY
ATTORNEY United States Patent Office 3,319,098
Patented May 9, 1967

3,319,098
BEARING AND ROTOR ASSEMBLY
Herbert L. Hartman, Elyria, Ohio, assignor, by mesne assignments, to the G.I. Company, Elyria, Ohio, a corporation of Ohio
Filed Aug. 22, 1963, Ser. No. 303,809
7 Claims. (Cl. 310—90)

My invention relates to bearings, and relates more particularly to the self-aligning type of bearing.

An object of my invention is to provide a self-aligning bearing wherein the entire rotor and bearing assembly revolves on the motor shaft and provides a uni-bearing construction.

Another object of my invention is to provide a self-aligning bearing assembly for small fractional horsepower motors, as for example, fan motors wherein the motor shaft is fixed, and a rotating bearing assembly carrying the rotor is adapted to have driven means, such as a fan, mounted thereon rotating therewith.

A still further object of my invention is to provide a minimum of length in the support for the bearing and fan assembly.

A further object of my invention is to provide a bearing of the type referred to which is simple to assemble, and adapted to be placed in pre-aligned position prior to its mounting upon the motor shaft.

Another object is to provide a bearing of the type referred to having a self-contained sealed lubricating supply.

Still a further object of my invention is to provide an improved bearing construction having but few parts, being relatively inexpensive to manufacture and highly efficient in use.

Other objects of my invention and the invention itself will become more readily apparent by reference to the accompanying description, reference being had to the accompanying drawings, in which:

FIG. 1 is a sectional view of a motor assembly showing the improved bearing assembly of my invention;

FIG. 2 is an expanded view of the bearing assembly of my invention.

Referring now to the drawings, in all of which like parts are designated by like reference characters, at 10 I show a stator of any desired character concentrically surrounding a rotor 11 which stator 10 is mounted on a stationary shaft 13 which projects, in the form shown, from one end of the rotor, viz the outboard end, and is press-fitted within an opening 14 in an end bracket 15 disposed at the inboard end of the motor, said bracket being secured by stator rivets 16 to the stator laminations.

The self-aligning bearing and rotor assembly of my invention is shown at 20. It comprises the rotor 11 and a bearing assembly consisting of a pair of similarly formed apertured bearings 21, 22 disposed within a tubular housing 27, said bearings being telescoped over the stationary motor shaft 13 at opposite ends thereof. The bearings 21, 22 are preferably formed of porous metal and are provided with spherical end surfaces 23, 24 respectively adapted to seat in annular bearing retainers or collars 25, 26 disposed at opposite ends of the housing and mounted therein. The housing member 27 is secured to the armature 12, as by cement, etc. disposed within externally disposed annular grooves 28 disposed within that portion of the housing 27 surrounded by the rotor.

The bearings 21, 22 are provided with reduced cylindrical confronting end portions 29, 30 respectively, providing shoulders 31, 32 respectively for seating opposite ends of a coil spring 33 telescoped over the shaft 13 and the reduced ends of the bearings, forcing the bearings into alignment and pressing them firmly within cone-shaped or tapered bearing seats 36, 37 on the bearing retaining members 25, 26 respectively. In the form shown the coil is closed and squared whereby the opposite end turns 34, 35 are flat and seat flush upon the bearing shoulders 31, 32. The bearing retainer member 25 is provided at either end thereof with enlarged cylindrical openings 38, 39 communicating with the bearing seat portions thereof, the outer opening 38 being preferably of less depth and smaller diameter than the opening 39 at the inner end of the bearing retainer member or collar 25; the tapered or cone-shaped surfaces 36, 37 of the members 25 and 26 are adapted to seat the spherical surfaces 23, 24 of the bearings 21, 22 respectively. An annular sealing member 41 is seated within the relatively shallow opening 38 of the bearing retainer 25 at the outer end thereof and the bearing members 21, 22 are spaced at their inner ends from the cylindrical walls of the openings 39, 40 in the retainer members. An end seal for the outboard end of the motor assembly is further provided by the use of an O-type retainer back-up washer 42 and a C-type washer 43, the washer 43 being secured in a concentric groove 44 in the outboard end of the stationary shaft 13, to secure the bearing assembly in its predetermined alignment.

The bearing retainer member 26 disposed adjacent the inboard end of the motor is provided with a pair of sequentially disposed openings 45, 46 of relatively increased diameter respectively, a neoprene annular washer 47 acting as running seal being seated within the enlarged opening 46 in the collar 26 and slidably telescoped over the shaft 13, "wiping" the surfaces thereof during motor operation. An annular washer 48 of relatively greater diameter than the washer 47 is adapted to back up the outer end of the retainer 26 and the washer 47 and is staked as at x at a plurality of positions to the rotor housing 12. An elongated tubular lubricant containing passage 51 is formed by the seals provided at either end of the housing.

The rotor housing 27 is provided with an outer support flange 50 extending radially outwardly from the housing body at the inboard end thereof, and, at opposite ends of the housing, open end recesses of relatively larger diameter than the inner diameter of the remainder of the body of the housing, and bearing collars 25, 26 are adapted to be press fitted therein.

An end or cover cap 60 is adapted to be secured, as by screws 61, or the like to the outermost flange 50 of the housing 27 and, as may be readily understood any type of driving mechanism, as a fan, may be mounted, as by dowel pins 62, etc., on the support flange of the housing.

To assemble the improved bearing construction of my invention, I contemplate that the rotor, housing and bearing structures may be pre-assembled in their preferred aligned position upon a shaft or cylindrical rod (not shown) having the approximate dimensions of the shaft 13. The shaft tool is removed prior to sliding the pre-assembled housing and bearing structure on the shaft 13 which is secured to a bracket and stator. Thereafter, the end seal and back up washers are placed on the opposite ends of the shaft and the end cover or fan support is affixed.

While I have described my invention in connection with a preferred embodiment thereof, it will be readily understood that changes may be made therein without however departing from the spirit of my invention and the appended claims.

What I claim is:

1. A self-aligning bearing and shaft asembly comprising in combination: a stationary shaft, a rotatable tubular housing, said shaft projecting longitudinally within and in spaced relation to said housing, a pair of aligned bearing retainer members disposed at opposite ends of said housing and rotatable therewith, an apertured bearing seated within each said bearing retainer member, said stationary shaft being disposed through said opposite bearings which are rotatable thereon, coil spring means loosely telescoped over said shaft and seated at either end on confronting portions of each of said opposite bearings.

2. A self-aligning bearing and shaft assembly comprising in combination: a stationary shaft, a rotatable tubular housing, said shaft projecting longitudinally within and in spaced relation to said housing, a pair of aligned bearing retainer members disposed at opposite ends of said housing and rotatable therewith, an apertured bearing seated within each said bearing retainer member, said stationary shaft being disposed through said opposite bearings which are rotatable thereon, coil spring means loosely telescoped over said shaft and seated at either end on confronting portions of each of said opposite bearings, sealing means disposed at either end of said housing, lubricant disposed within the housing about the shaft and bearings.

3. An electric motor comprising a stator, a rotor, said stator in concentric surrounding relationship to said rotor, a stationary shaft secured to the stator, a tubular bearing housing member secured to said rotor and rotatable therewith, said stationary shaft disposed longitudinally within said housing member, said bearing housing member having a pair of bearing retainer members rotatable therewith and mounted therein at opposite ends thereof, each said bearing retainer member having bearings seats, a pair of apertured bearings, each said bearing seated within said bearing seats, spring means seated on and interposed between the ends of said bearings forcing said bearings into alignment and into seating engagement with the bearing seats wherefor the bearings rotate with said retainer members within which said bearings are seated, said spring means telescoped over and in spaced relation to said shaft.

4. An electric motor comprising a stator, a rotor, said stator in concentric surrounding relationship to said rotor, a stationary shaft secured to the stator, a tubular bearing housing member secured to said rotor and rotatable therewith, said stationary shaft disposed longitudinally within said housing member, said bearing housing member having a pair of bearing retainer members rotatable therewith and mounted therein at opposite ends thereof, each said bearing retainer member having cone-shaped bearing seats, a pair of apertured bearings, each bearing having spherical surfaces seated within said cone-shaped bearing seats, spring means interposed between the ends of said bearing forcing said bearings into alignment and into seating engagement with the cone-shaped bearing seats, said spring means telescoped over and in spaced relation to said shaft.

5. An electric motor comprising a stator, a rotor, said stator in concentric surrounding relationship to said rotor, a stationary shaft secured to the stator, a tubular bearing housing member integrally secured to said rotor and rotatable therewith, said stationary shaft disposed longitudinally within said housing member, said bearing housing member having a pair of bearing retainer members mounted therein, each said bearing retainer member having bearing seats, a pair of apertured bearings, each said bearing seated within said bearing seats, spring means interposed between the ends of said bearings forcing said bearings into alignment and into seating engagement with the bearing seats, said spring means telescoped over and in spaced relation to said shaft, sealing means disposed at either end of said shaft adjacent an end of each bearing and each said bearing retainer member, said tubular housing and seating means forming a lubricant containing passage.

6. An electric motor comprising a stator, a rotor, said stator in concentric surrounding relationship to said rotor, a stationary shaft secured to the stator, a tubular bearing housing member integrally secured to said rotor and rotatable therewith, said stationary shaft disposed longitudinally within said housing member, said bearing housing member having a pair of bearing retainer members mounted therein, each said bearing retainer member having cone-shaped bearing seats, a pair of apertured bearings, each said bearing having spherical surfaces seated within said cone-shaped bearing seats, spring means interposed between the ends of said bearings forcing said bearings into alignment and into seating engagement with the cone-shaped bearing seats, said spring means telescoped over and in spaced relation to said shaft, sealing means disposed at either end of said shaft adjacent an end of each bearing and each said bearing retainer member, said tubular housing and seating means forming a lubricant containing passage.

7. An electric motor comprising a stator, a rotor, said stator in concentric surrounding relationship to said rotor, a stationary shaft secured to the stator, a tubular bearing housing member secured to said rotor, said stationary shaft disposed longitudinally within said housing member, said bearing housing member having an inner recessed portion at each end thereof, a pair of bearing retainer members mounted therein and secured in each said recess, each said bearing retainer member having tapered inner surfaces, a pair of apertured bearings, each said bearing having spherical surfaces adapted to be seated within the tapered inner surfaces of its bearing retainer, spring means interposed between the ends of said bearings and seating thereon forcing said bearings into alignment and into seating engagement with the tapered inner surfaces of its seat bearing retainer member, said spring means telescoped over and in spaced relation to said shaft, sealing means disposed at either end of said shaft adjacent an end of each bearing and each said bearing retainer member, said tubular housing and seating means forming a lubricant containing passage.

References Cited by the Examiner

UNITED STATES PATENTS

| | | | |
|---|---|---|---|
| 1,568,334 | 1/1926 | Hubbard | 308—70 |
| 1,620,101 | 3/1927 | Huffman | 103—87 |
| 2,448,500 | 8/1948 | Turner | 310—90 |
| 2,904,709 | 9/1959 | Lautner | 310—90 |
| 3,195,466 | 7/1965 | Young | 103—87 |

MILTON O. HIRSHFIELD, *Primary Examiner.*

O. L. RADER, L. L. SMITH, *Assistant Examiners.*